W. J. GRUSS & D. C. DEMAREST.
REGRINDER.
APPLICATION FILED MAR. 23, 1911.
1,025,185.
Patented May 7, 1912.
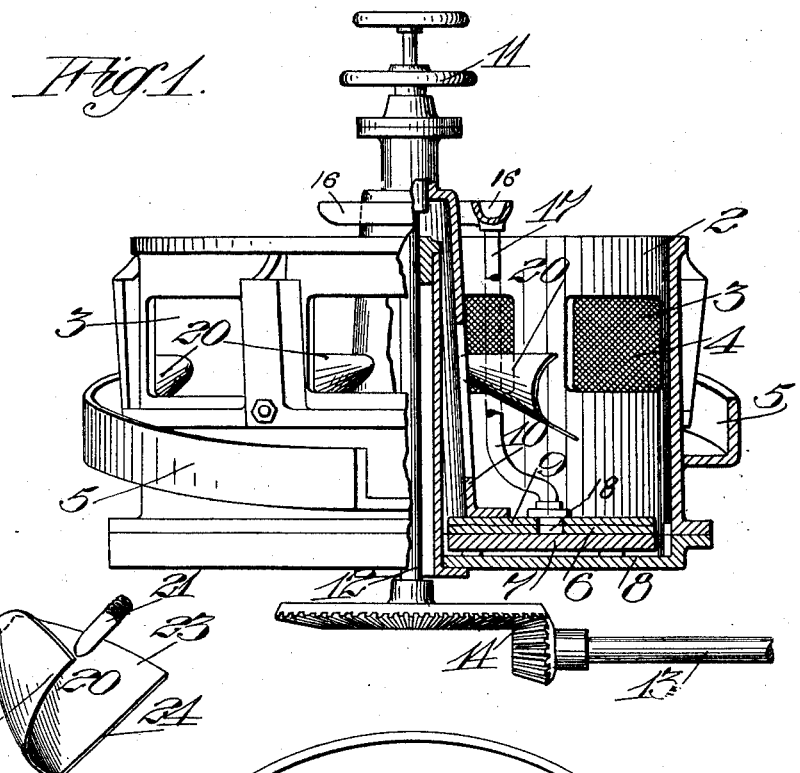
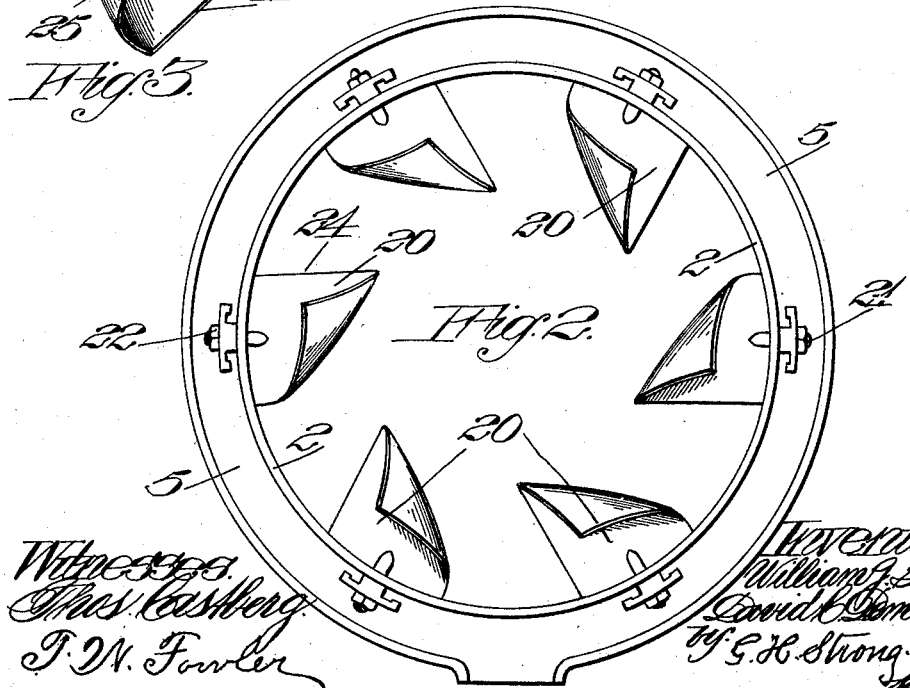

UNITED STATES PATENT OFFICE.

WILLIAM J. GRUSS AND DAVID C. DEMAREST, OF SAN FRANCISCO, CALIFORNIA.

REGRINDER.

1,025,185.  Specification of Letters Patent.  Patented May 7, 1912.

Application filed March 23, 1911. Serial No. 616,536.

*To all whom it may concern:*

Be it known that we, WILLIAM J. GRUSS and DAVID C. DEMAREST, citizens of the United States, residing in the city and county of San Francisco and State of California, have invented new and useful Improvements in Regrinders, of which the following is a specification.

This invention relates to grinding machinery, and is particularly pertinent to regrinders.

Heretofore the sole object to be accomplished in grinding pans has been to reduce the material that enters the pan to an extremely fine state, known as slimes. These slimes are such as are produced in the ordinary revolving tube-mill, the object of sliming being to so reduce the size of the particles of the ore as to allow the cyanid solution to get into contact with each minute particle of gold, or other material to be recovered, that may be contained in the ore. In the old way of operating pans this object of sliming was accomplished by retaining the pulp within the pan to enable this extremely fine grinding to be accomplished.

We have found, by experiment, that if the pulp can pass beneath the grinding surfaces of the pan and be discharged with sufficient rapidity, then the regrinding can be accomplished down to a certain fineness of the material without producing what we have stated as slimes.

The object of our invention is to provide a regrinder adapted to pass the material to be ground quickly to the grinding surface between the shoe and die and discharge it rapidly from the body of the pan through peripheral screen surfaces, thus providing what we term a "non-sliming regrinder."

Instead of feeding the ore pulp into the pan promiscuously, then endeavoring to force it into the spaces between the shoes and dies, our object is to provide a means for delivering this pulp directly from a source of supply to the effective zone of the grinding surface of the pan shoes and dies; and to provide in combination with the regrinder devices, having the office and function of continually impinging the pulp in the pan against the screening surface so as to cause a continual discharge from the pan of the ore as it is reground and thus prevent the production of slimes which, when occurring, require a special apparatus for their successful treatment and from which it is extremely difficult to extract the valuable materials.

The invention consists of the parts and the construction and combination of parts, as hereinafter more fully described and claimed, having reference to the accompanying drawings, in which—

Figure 1 is a side elevation in partial section of the improved grinder. Fig. 2 is a plan view of the same. Fig. 3 is a perspective view of one of the discharging scoops.

In the present embodiment of our invention we employ a suitably shaped pan wall 2, provided with a plurality of circumferential openings 3, over which are removably placed screens 4 of appropriate or desirable mesh; and around the exterior surface of the pan wall is provided a discharge launder 5 adapted to receive pulp as it is discharged through the screens 4.

Any preferred style or form of grinding shoes, as 6, may be employed, which are adapted to rotate above removable dies 7 resting upon the bottom 8 of the regrinding pan. The shoes 6 are attached to a suitable muller 9, having a hub 10 projecting upwardly through the pan and which is adjustable by well-known devices represented by the screws 11. Any suitable form of driving mechanism, as the vertical shaft 12 and the horizontal shaft 13, may be used to drive the muller, power being communicated from one to the other by means of suitable gearing 14.

The ore to be reground is delivered into the pan by means of a circular launder 16 passing entirely around the upper portion of the hub 10 of the muller, and either made of one casting of this hub or fastened to it. The supply launder receives its ore from any suitable source and is adapted to turn in unison with the muller. From the bottom of this circular launder we lead downwardly conducting pipes 17, terminating in the muller plate at points between the inside and outside boundaries of the pan shoes. The pipes 17 terminate at the upper surface of the muller and register with mouths 18, which open beneath the muller so as to permit the pulp to flow into the radial spaces formed between the several sections or shoes 6. This construction enables the pulp to pass directly from the supply source to the pan launder 16; thence downwardly through the pipes 17 and through and along the spaces between the shoes 6, lodging upon the grinding surface of the dies 7. By this means the grinding capacity of the present regrinder is greatly increased over the old regrinder in which the pulp is distributed into the pan and induced, by various devices, to enter between the shoes and dies.

We construct the cylindrical pan wall 2 with practically a continuous screen surface extending normally around its entire periphery. These screen openings are placed as near to the pan bottom as is found practical. Besides, the openings and the screens, themselves, are as deep as possible, affording a very large surface for the discharge of the ground material from the pan. It will be noticed that instead of having a discharge through a single screen or through a single classifier, we multiply the screen openings so as to take in practically the entire periphery of the pan sides with the exception of vertical webs which form ties in the wall 2.

We have found it a fact, that even with a continuous discharge screen surface extending substantially entirely around the pan, the material is not taken away from the pan rapidly enough to accomplish the object of non-sliming, so we have devised a means of forcing the discharge of the material from the pan body through the screens 3 as rapidly as the pulp is ground to a size sufficient to pass through the screens. This is accomplished by placing within the wall 2 of the pan, just below each of the screen frame openings, a suitably shaped wing 20, extending into the pan and adjustably fastened to the wall. By means of a screw 21 on each of the wings, which screws are adapted to pass through perforations formed for their reception in the wall 2, the protruding portion of the screw 21 is adapted to receive a locking or chambered nut 22 by which a curved edge of the wing 20 is drawn tightly against the inner surface of the wall 2. Each of these wings 20 has a substantially flat plane 23 and a straight edge 24 forming a lip projecting substantially radial in the pan and adapted to pick up the revolving volume of pulp in the pan. The several wings are so disposed that the swirling pulp will be caught upon the upper surface of the plane 23. The wings are so positioned in the pan that the pulp is violently impinged against an adjacent screen 4 so that such portion of the pulp as has been reduced to the desired fineness will be discharged from the pan.

For the purpose of forming a wave of the pulp as it rides upon the adjustable wing 20, one end of the wing is turned upwardly, as at 25, forming a scoop which retains the fluid pulp and directs and confines its flow toward the screen window 4 adjacent which the wing 20 is mounted. Each of the screen frame openings has its corresponding scoop shaped, adjustable wing. The object of these wings is to deflect the flow of pulp in the pan produced by the rotation of the muller in such a way as to make a distinct wave impinging against the screen surfaces. It will be seen that these wings then have the effect of carrying all the finer material of a size sufficient to be discharged up to the screens with velocity and force enough to drive it rapidly through the screen. The adjustable feature of these scoop shaped wings is to provide means to change the length and force of the impinging wave, and when placed in a proper position will produce a maximum discharge from the pulp.

Having thus described our invention, what we claim and desire to secure by Letters Patent, is—

1. A regrinder comprising a pan, having a wall provided with a plurality of discharge openings, screens closing said openings, means for grinding pulp in said pan, and means attached to the wall of the pan whereby the pulp is impinged in waves against the screens, said means including scoop shaped wings attached to the inner surface of the wall of the pan having open sides presented in opposition to the course of the pulp, said wings adapted to direct the waves of pulp against the screens.

2. A regrinder comprising a pan, grinding devices mounted in said pan, said pan having discharge openings, screens covering said openings, and adjustable wave forming devices of scoop-like form having open sides presented in opposition to the travel of the pulp for diverting the course thereof, said devices being attached to the inside of the pan and adapted to direct the agitated pulp in waves against the screens of the discharge openings.

3. A regrinder having a pan provided with a plurality of openings forming a large discharge area around the circumference of the pan, screens partially closing said pan, adjustable wave forming devices of scoop-like form having open sides presented in opposition to the travel of the pulp, for diverting the course thereof, said devices being attached to the pan and adapted to create and impinge waves against the screens, and means for grinding pulp in the pan.

4. A regrinder having a pan provided with a plurality of openings forming a large discharge area around the circumference of the pan, screens partially closing said openings, adjustable wave forming devices of scoop-like form having open sides presented in opposition to the travel of the pulp, for diverting the course thereof, said devices being attached to the pan and adapted to create and impinge waves against the screens, means for grinding pulp in the pan, and a pulp feeding means comprising connections for conducting the pulp to the grinding means.

5. In an ore grinder, a pan with suitable grinding mechanism, said pan having peripheral discharge openings, said scoop shaped deflectors proximate to said openings and projecting into the pan and having open sides presented in opposition to the path of travel of the agitated contents of the pan.

In testimony whereof we have hereunto set our hands in the presence of two subscribing witnesses.

WILLIAM J. GRUSS.
DAVID C. DEMAREST.

Witnesses:
A. J. HENRY,
F. E. MAYNARD.

Copies of this patent may be obtained for five cents each, by addressing the "Commissioner of Patents, Washington, D. C."